(12) United States Patent
Kim et al.

(10) Patent No.: US 11,838,770 B2
(45) Date of Patent: Dec. 5, 2023

(54) METHOD AND DEVICE FOR TRANSMITTING AND RECEIVING IMPORTANT UPDATE INFORMATION OF ANOTHER AP THROUGH ML ELEMENT IN WLAN SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Insun Jang, Seoul (KR); Sunhee Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/139,177

(22) Filed: Apr. 25, 2023

(65) Prior Publication Data

US 2023/0262488 A1    Aug. 17, 2023

Related U.S. Application Data

(63) Continuation of application No. PCT/KR2022/003424, filed on Mar. 11, 2022.

(30) Foreign Application Priority Data

Mar. 11, 2021  (KR) .......... 10-2021-0032056
Mar. 11, 2021  (KR) .......... 10-2021-0032261

(51) Int. Cl.
*H04W 4/00* (2018.01)
*H04W 24/02* (2009.01)
(Continued)

(52) U.S. Cl.
CPC .......... *H04W 24/02* (2013.01); *H04L 1/1642* (2013.01); *H04W 84/12* (2013.01)

(58) Field of Classification Search
CPC .............. H04W 24/02; H04L 1/642
(Continued)

(56) References Cited

U.S. PATENT DOCUMENTS

| 2021/0014776 | A1 | 1/2021 | Patil et al. | |
|---|---|---|---|---|
| 2022/0418022 | A1* | 12/2022 | Kneckt | ................ H04W 36/06 |
| 2023/0053972 | A1* | 2/2023 | Patil | ...................... H04W 76/28 |

FOREIGN PATENT DOCUMENTS

| JP | 2020150333 | 9/2020 |
|---|---|---|
| WO | 2021011476 | 1/2021 |

OTHER PUBLICATIONS

PCT International Application No. PCT/KR2022/003424, International Search Report dated Jun. 9, 2022, 3 pages.
(Continued)

*Primary Examiner* — Temica M Beamer
(74) *Attorney, Agent, or Firm* — LEE, HONG, DEGERMAN, KANG & WAIMEY PC

(57) ABSTRACT

Proposed are a method and a device for transmitting and receiving important update information of another AP through an ML element in a WLAN system. Specifically, a receiving MLD receives a basic ML element from a transmitting MLD over a first link. The receiving MLD decodes the basic ML element. The basic ML element includes a profile field of the second transmitting STA. The profile field of the second transmitting STA includes a first CSF presence field. When the value of the first CSF presence field is set to 0, the profile field of the second transmitting STA includes a first CSF field. The first CSF field includes information about the current change sequence number of the second transmitting STA.

17 Claims, 23 Drawing Sheets

(51) Int. Cl.
    *H04L 1/1607* (2023.01)
    *H04W 84/12* (2009.01)

(58) Field of Classification Search
    USPC .......................................................... 370/329
    See application file for complete search history.

(56) References Cited

OTHER PUBLICATIONS

Mark Rison, "Review of P802.11be/D0.3 for CC34", doc.: IEEE 802.11-21/0218r0, Feb. 2021, 48 pages.
Rojan Chitrakar, "Multi-link Setup clarifications", doc.: IEEE 802.11-20/0751r0, Jun. 2020, 20 pages.

* cited by examiner (a)

PPDU Format (IEEE 802.11a/g):
| L-LTF | L-STF | L-SIG | Data |

HT PPDU Format (IEEE 802.11n):
| L-LTF | L-STF | L-SIG | SIG A | HT-SFT | HT-LFT | ... | HT-LFT | Data |

VHT PPDU Format (IEEE 802.11ac):
| L-LTF | L-STF | L-SIG | VHT-SIG A | VHT-SFT | VHT-LFT | VHT-SIG B | Data |

| 8μs | 8μs | 4μs | 4μs | 8μs | 4μs per symbol | 4μs | Variable durations per HE-LTF symbol | | |
|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

FIG. 10

| L-STF | L-LTF | L-SIG | RL-SIG | U-SIG | EHT-SIG | EHT-STF | EHT-LTF | Data |

… (1)

METHOD AND DEVICE FOR TRANSMITTING AND RECEIVING IMPORTANT UPDATE INFORMATION OF ANOTHER AP THROUGH ML ELEMENT IN WLAN SYSTEM

CROSS-REFERENCE TO RELATED APPLICATIONS

This application is a continuation of International Application No. PCT/KR2022/003424 filed on Mar. 11, 2022, which claims the benefit of earlier filing date and right of priority to Korean Patent Application Nos. 10-2021-0032056, filed on Mar. 11, 2021, and 10-2021-0032261, filed on Mar. 11, 2021, the contents of which are hereby incorporated by reference herein in their entireties.

TECHNICAL FIELD

The present specification relates to a multi-link operation in a wireless LAN system, and more particularly, to a method and apparatus for transmitting and receiving critical update information of another AP through an ML element.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for transmitting and receiving critical update information of another AP through an ML element in a WLAN system.

An example of this specification proposes a method for requesting transmitting and receiving critical update information of another AP through an ML element.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for transmitting information related to critical updates of other APs in MLD communication by including a CSF field in a basic ML element. Here, a first transmitting STA connected through a first link to a first receiving STA included in a receiving MLD may correspond to a peer AP, and second and third transmitting STAs connected through different links (second and third links) may correspond to different APs.

A receiving multi-link device (MLD) receives a Basic Multi-Link (ML) element from a transmitting MLD through a first link.

The receiving MLD decodes the basic ML element.

The transmitting MLD includes a first transmitting station (STA) operating on the first link and a second transmitting STA operating on a second link. The receiving MLD includes a first receiving STA operating on the first link and a second receiving STA operating on the second link.

The basic ML element includes a profile field of the second transmitting STA. The profile field of the second transmitting STA includes a first Change Sequence Field (CSF) present field. When a value of the first CSF present field is set to 1, the profile field of the second transmitting STA includes the first CSF field. The first CSF field includes information on a current change sequence number of the second transmitting STA. That is, the first receiving STA may obtain a change sequence number value of the second transmitting STA through the basic ML element when a critical update of the second transmitting STA occurs.

The basic ML element may be included in a beacon frame, a probe response frame, or an association response frame. The probe response frame may be a response frame in response to a probe request frame or an unsolicited probe response frame. In addition, a probe request frame used for Multi-Link Setup (ML setup) may include a probe request ML element. Unlike the basic ML elements, the probe request ML element does not include all elements, but includes only requesting/requested elements and is configured as a frame.

That is, this embodiment proposes a method of transmitting information on the change sequence number (or critical update event version) of other APs in the AP MLD by including the CSF field in the Per-STA profile (profile of the second or third transmitting STA) included in the basic ML element.

According to the embodiment proposed in this specification, when ML configuration is performed between an AP MLD and a non-AP MLD, the non-AP MLD obtains a change sequence number value of another AP through a beacon frame, a probe response frame, or an association response frame, so that the non-AP MLD can check the exact critical update event version of another AP at that time. As such, in the event of a critical update during the ML setup process, an error in which the version of critical update information of another AP and the version of critical update information of a non-AP STA do not match can be prevented.

BRIEF DESCRIPTION OF THE DRAWINGS

FIG. 4 illustrates an example of a PPDU used in an IEEE standard.

FIG. 10 illustrates an example of a PPDU used in the present specification.

DETAILED DESCRIPTION

Figure 1:
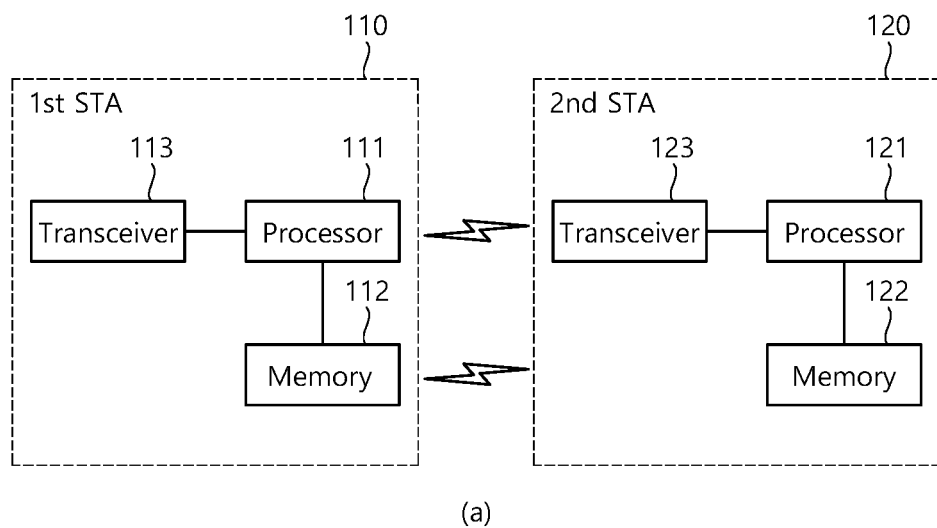
FIG. 1 shows an example of a transmitting apparatus and/or receiving apparatus of the present specification.
Figure 1:
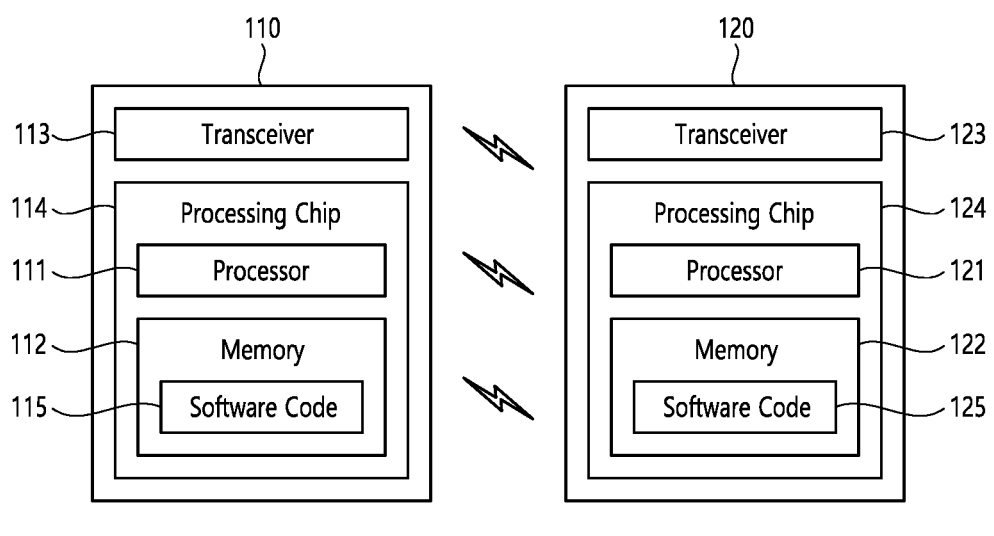

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
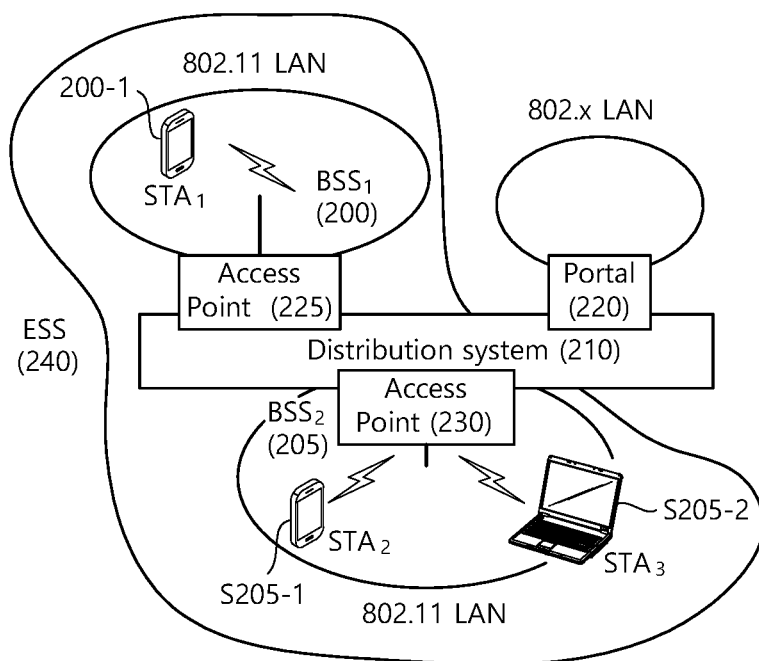
FIG. 2 is a conceptual view illustrating the structure of a wireless local area network (WLAN).
Figure 2:
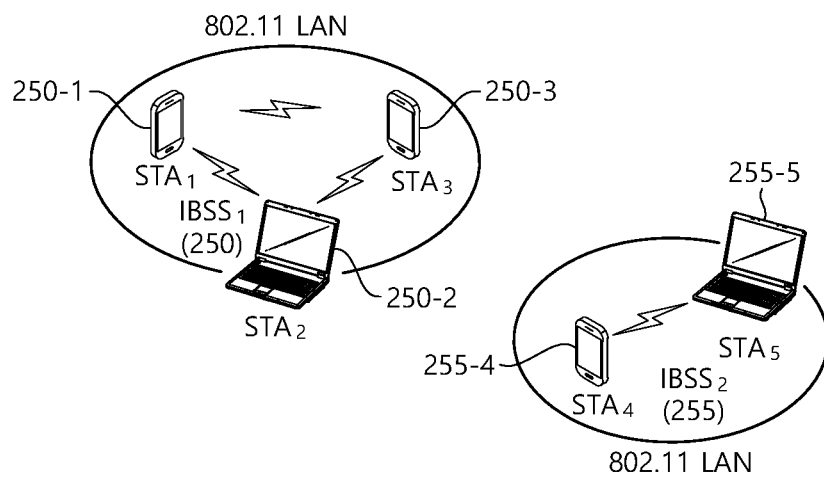

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
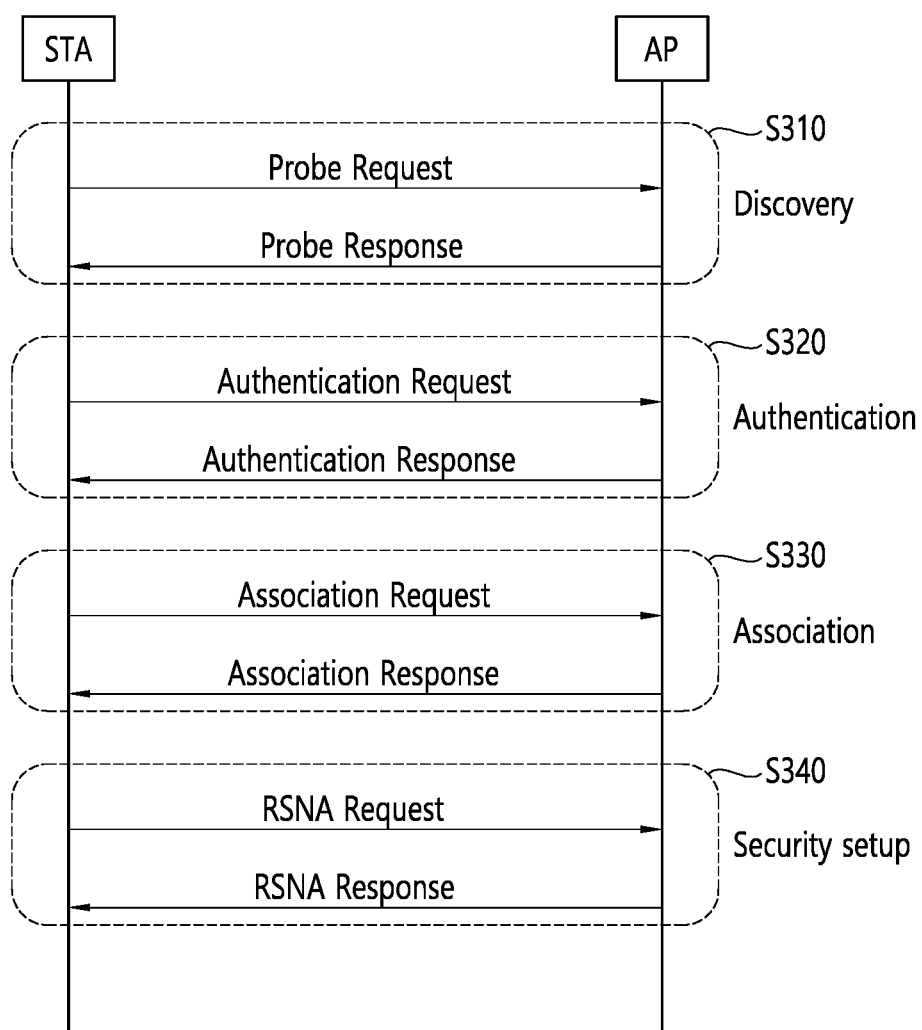
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
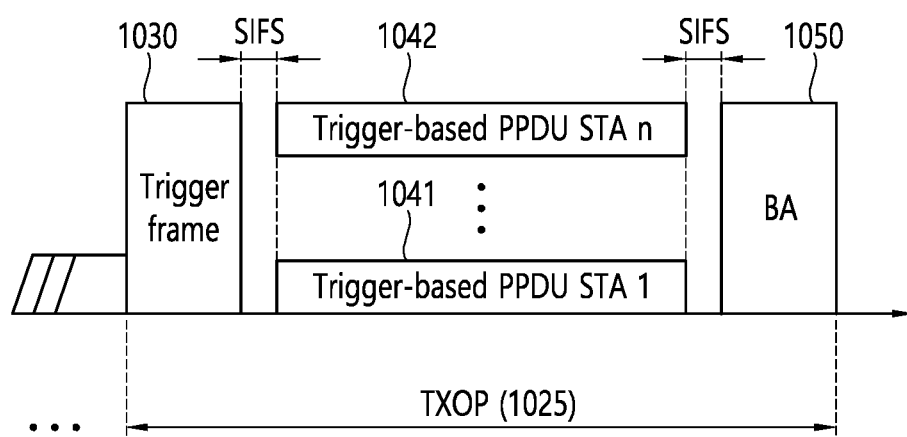
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
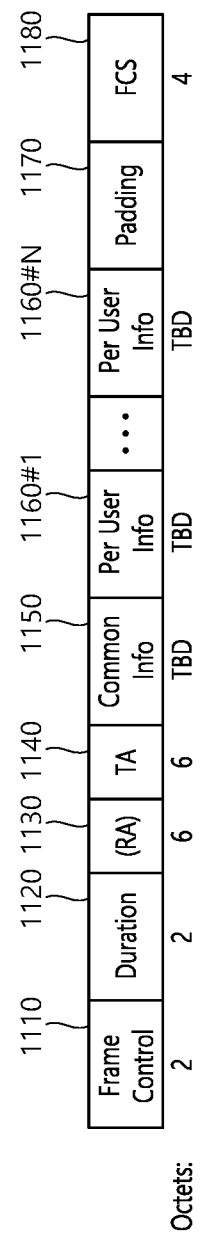
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame.

A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
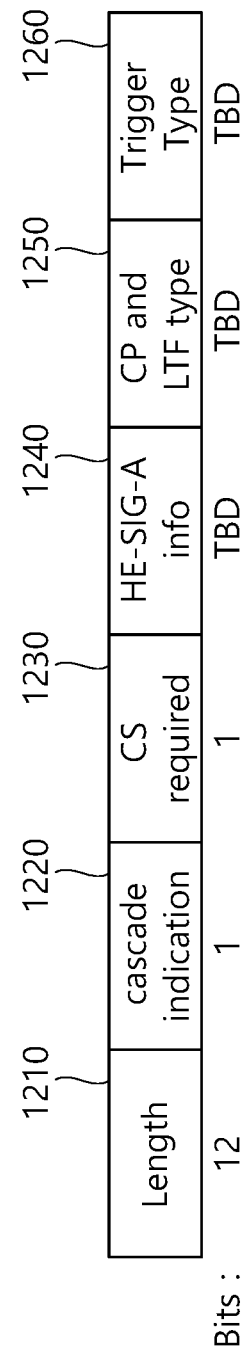
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
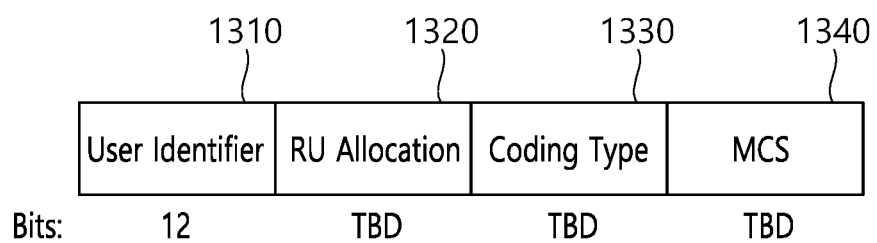
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
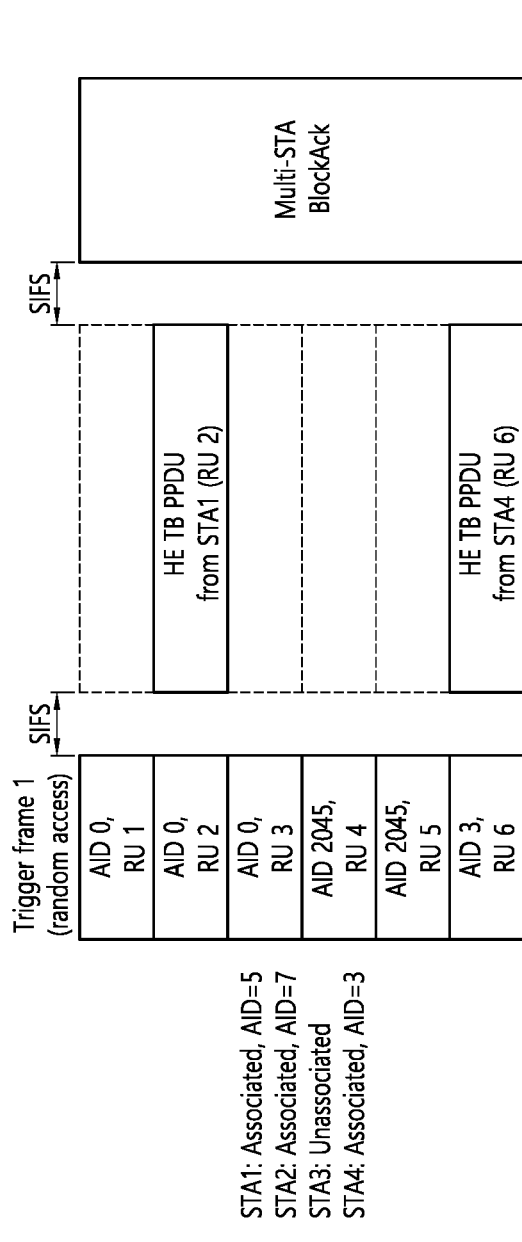
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
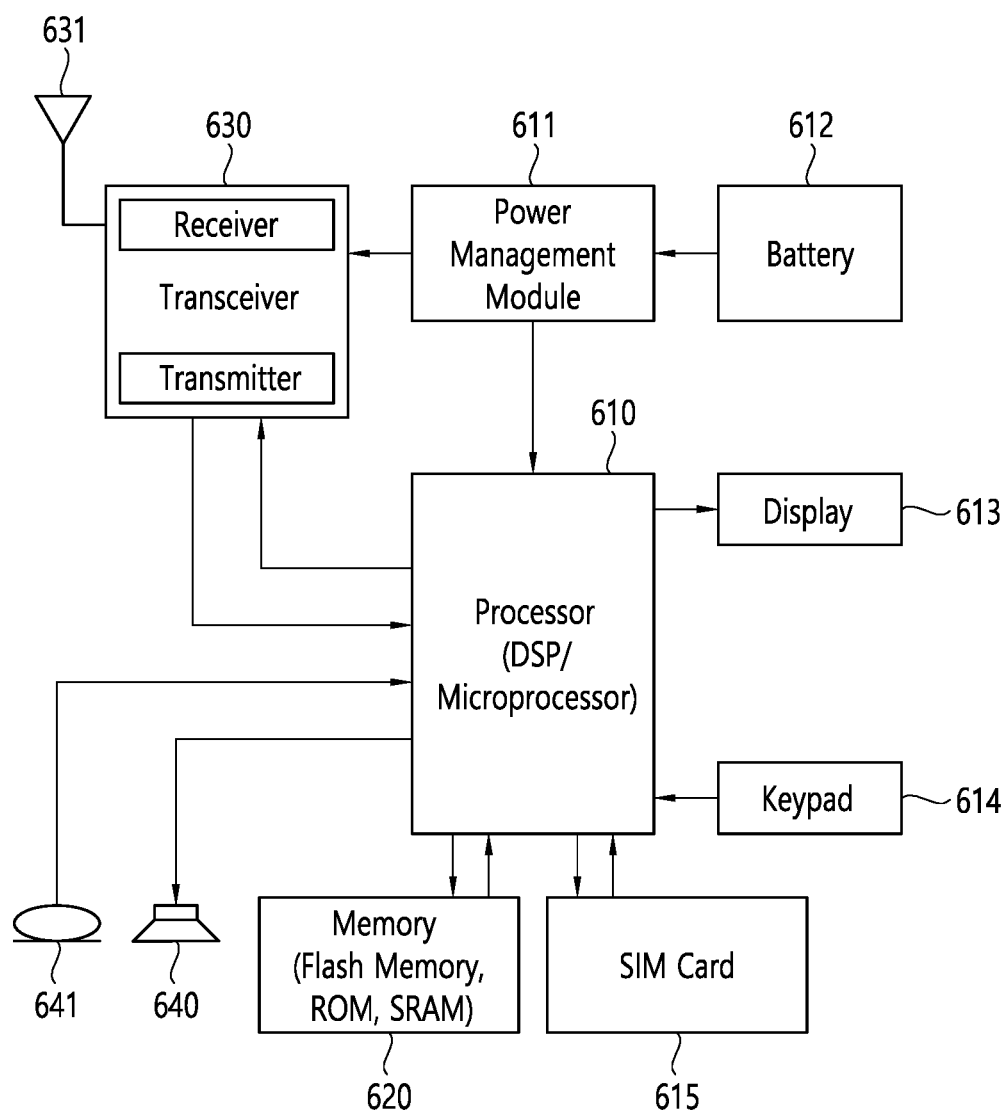
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHz/6 GHz band) and at least one channel within the 5 GHz band (or 2.4 GHz/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHz, 5 GHz, 6 GHz, 60 GHz, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

In the following specification, for convenience of explanation, it is described that the MLD (or the processor of the MLD) controls at least one STA, but is not limited thereto. As described above, the at least one STA may transmit and receive signals independently regardless of MLD.

According to an embodiment, an AP MLD or a non-AP MLD may have a structure having a plurality of links. In other words, a non-AP MLD can support multiple links. A non-AP MLD may include a plurality of STAs. A plurality of STAs may have Link for each STA.

In the EHT standard (802.11be standard), the MLD (Multi-Link Device) structure in which one AP/non-AP MLD supports multiple links is considered as a major technology. STAs included in the non-AP MLD may transmit information about other STAs in the non-AP MLD together through one link. Accordingly, there is an effect of reducing the overhead of frame exchange. In addition, there is an effect of increasing the link use efficiency of the STA and reducing power consumption.

Here, multi-link may include multi-band. That is, multi-link can represent links of several bands and multiple multi-links within one band at the same time.

Figure 12:
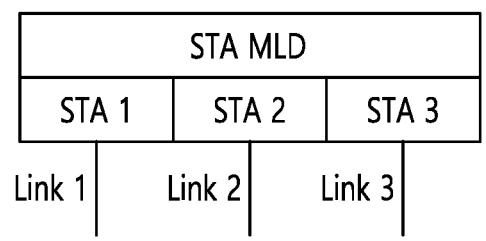
FIG. 12 shows an example of a structure of a STA MLD.

FIG. 12 shows an example of a structure of a STA MLD.

FIG. 12 shows an example in which one STA MLD has three links. n 802.11be, one STA in the STA MLD must provide information on one or more links in addition to its own link for multi-link setup (that is, to simultaneously associate (setup) several links through an association frame exchange in one link). To provide this information, a Multi-Link element has been defined, and the basic structure of the Multi-Link element is shown in FIG. 13.

Figure 13:
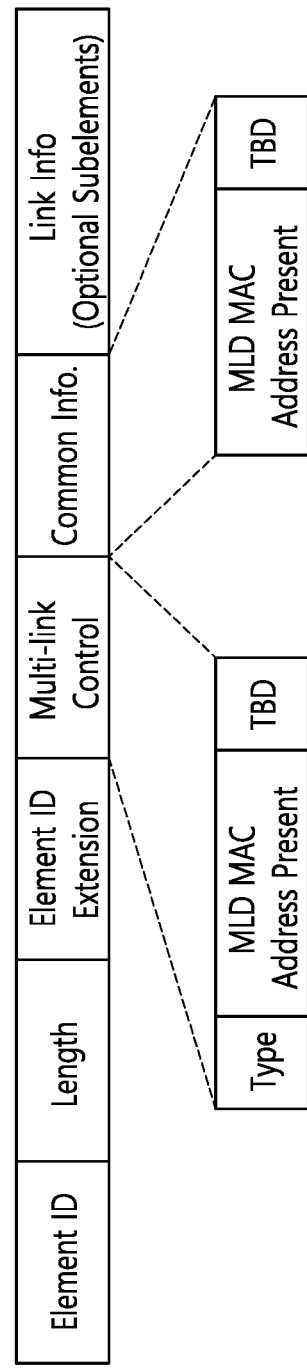
FIG. 13 illustrates structures of a Multi-link Control field and a Common Info field of a Multi-link Element.

The order, name, and size of the fields shown in FIG. 13 may change and may exist as additional fields. Basically, Common info means common information between STAs in the MLD, and specific information on each STA is indicated in the Per-STA Profile.

FIG. 13 illustrates structures of a Multi-link Control field and a Common Info field of a Multi-link Element.

Referring to FIG. 13, the Multi-link Control field includes a Type subfield and an MLD MAC Address Present subfield. The Common Info field includes the MLD MAC Address subfield. When the MLD MAC Address Present subfield is set to 1 (or 0), MAC addresses of STAs in the MLD may be included in the MLD MAC Address subfield.

Figure 14:
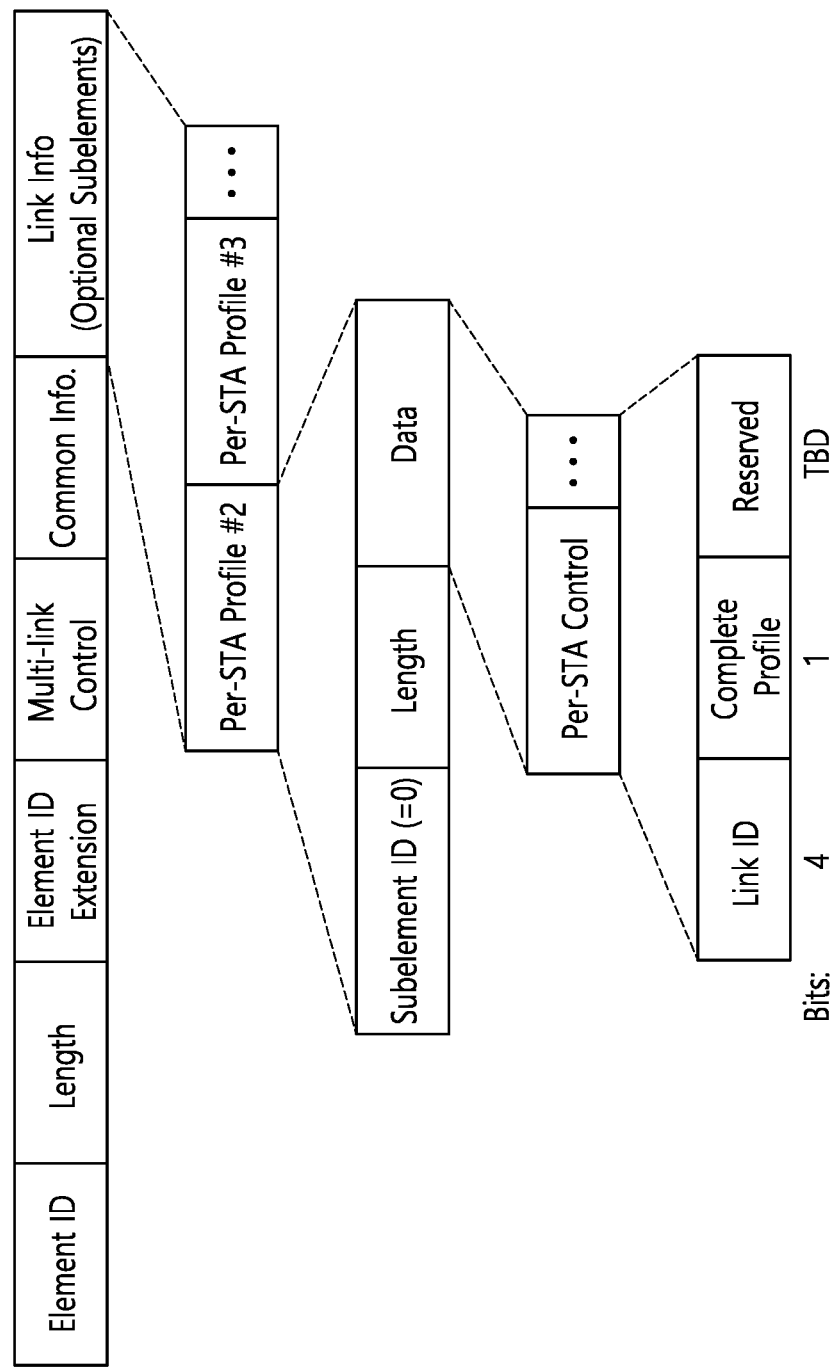
FIG. 14 shows the structure of a Link Info field of the Multi-link Element.

FIG. 14 shows the structure of a Link Info field of the Multi-link Element.

Referring to FIG. 14, the Link Info field includes a Per-STA Profile subfield when the optional subelement ID is 0, and includes a Vendor Specific subfield when the optional subelement ID is 221. Optional subelement IDs for Multi-link Element are defined as follows.

TABLE 1

| Subelement ID | Name | Extensible |
| --- | --- | --- |
| 0 | Per-STA Profile | Yes |
| 1-220 | Reserved | |
| 221 | Vendor Specific | Vendor defined |
| 222-255 | Reserved | |

The Link Info field includes a Per-STA Profile subfield for other STAs (STAs operating in the non-association link) within the same MLD. Referring to FIG. 14, assuming that the STA MLD includes STA 2 and STA 3, the Link Info field may include a Per-STA Profile #2 subfield for STA 2 and a Per-STA Profile #3 subfield for STA 3.

Basically, the Common Info field means common information between STAs in the MLD, and specific information about each STA/link is indicated in the Per-STA Profile including the Link ID corresponding to the STA. In particular, in the Multi-link Element of the Association Request/Response frame used for multi-link setup (association), the Complete Profile of the Per-STA Control field is set to 1, and the Multi-link Element must always include complete information of AP MLD and non-AP MLD. In this specification, a structure for this complete profile or complete information is proposed. The configuration of the Complete Profile (or Complete information) defined so far is shown in FIG. 15.

Figure 15:
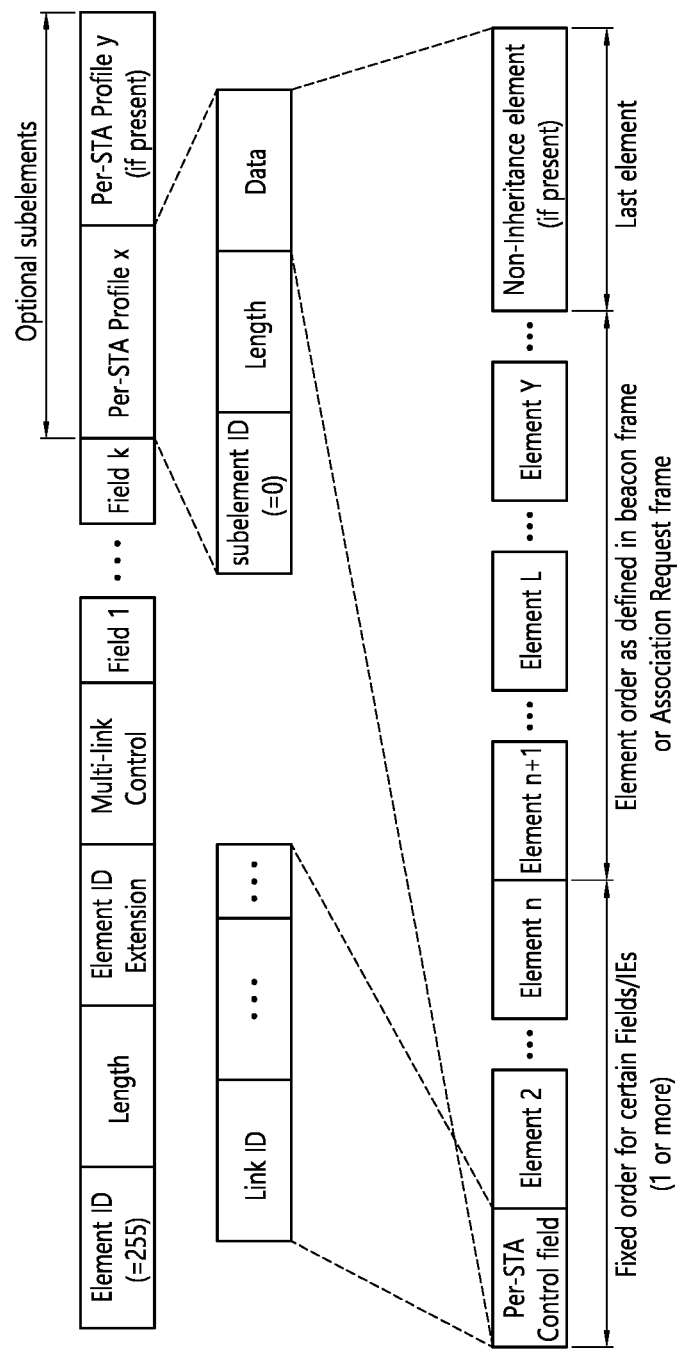
FIG. 15 shows the structure of a Complete Profile in a Per-STA Profile of the Multi-link Element.

FIG. 15 shows the structure of a Complete Profile in a Per-STA Profile of the Multi-link Element.

Referring to FIG. 15, Field 1 to Field k after the Multi-link Control field mean Common Info mentioned in FIG. 13. Based on Per-STA Profile x, this includes fields and/or elements composed of a fixed order starting with the Per-STA Control field, and then elements defined in the Beacon/Probe Response/Association Request frame (e.g., HT/VHT/HE/EHT capabilities IE (Information Element)) are included.

However, in the case of the probe response frame, information included in the probe response frame may be a complete profile or a partial profile, depending on whether the information requested by the STA is complete information or partial information.

In this specification, a partial profile provided when the information provided by the AP is partial information rather than complete information is defined.

Therefore, in this specification, the concept and structure of a Partial Profile in which an AP delivers part of complete information which is not a Complete Profile of a specific AP (i.e., any AP(s) in AP MLD). through an Unsolicited Broadcast Probe Response frame, a Probe Response frame, etc. are defined.

The Partial Profile structure can be defined as follows depending on the case of providing information of Probe Response.

1) When a non-AP STA requests partial information of specific APs through an ML Probe request.

In 802.11be, a non-AP STA may request partial information rather than all information of specific APs indicated by a Link ID in the Per-STA Profile by including the Per-STA Profile as a subelement (Extended) Request element in the ML Probe Request (Probe Request frame including Multi-Link element). At this time, the requested information is an element ID list indicated in the Requested Element IDs field of the (Extended) Request element. The AP receiving the corresponding ML Probe Request checks the information requested for the corresponding AP through the Requested Element IDs field information of the (Extended) Request element included in each Per-STA Profile subelement of the Multi-Link element and responds by including information about it in the ML Probe Response. At this time, the structure of the Partial Profile included in the ML Probe Response is shown in FIG. 16.

Figure 16:
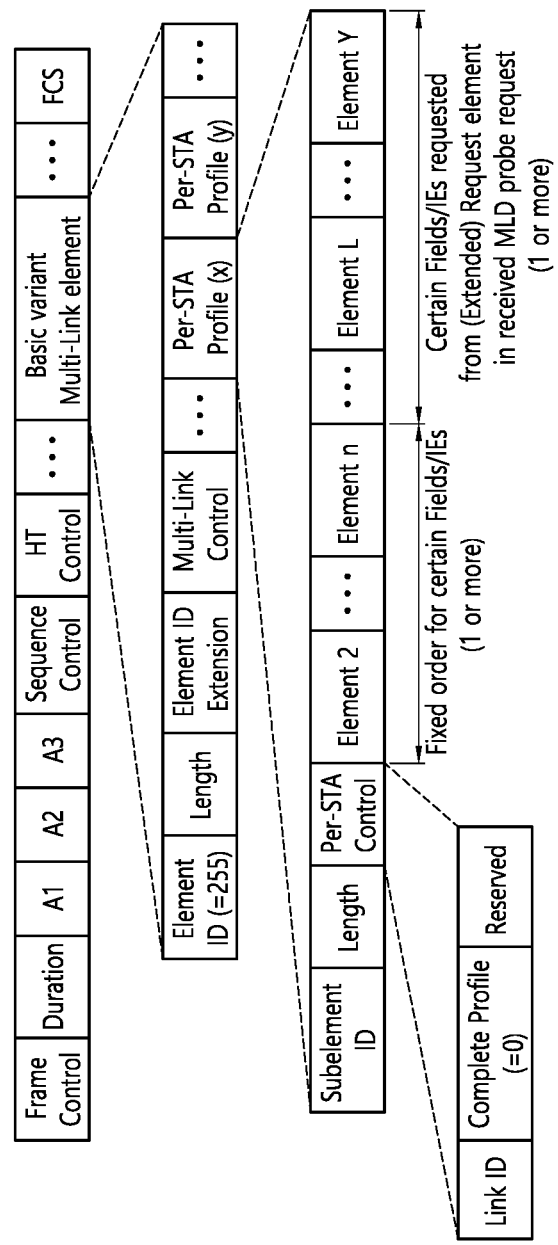
FIG. 16 shows the structure of a Partial Profile in a Per-STA Profile included in a ML Probe Response.

FIG. 16 shows the structure of a Partial Profile in a Per-STA Profile included in a ML Probe Response.

Referring to FIG. 16, based on the element ID information requested by the non-AP STA through the (Extended) Request element for specific APs, the ML Probe Response may be transmitted by including the corresponding element information in the Per-STA Profile corresponding to the corresponding AP. For example, as shown in FIG. 16, when the Basic variant Multi-Link element includes a Partial Profile, the Complete Profile of the Per-STA Control field is set to 0 for the Per-STA Profile subelement, information corresponding to Element L to Element Y may be included in the order of element ID indicated in the (Extended) Request element included in the Per-STA Profile subelement corresponding to the per-STA profile corresponding to the ML Probe Request by the non-AP STA.

2) When the AP provides partial information through an Unsolicited Broadcast Probe Response frame without a request from a non-AP STA In 802.11be, a non-AP STA can transmit an Unsolicited Broadcast Probe Response frame including partial information rather than all information of any AP(s) of AP MLD without a request for ML Probe Request (Probe Request frame including Multi-Link element). At this time, the structure of the Partial Profile included in the Unsolicited broadcast ML Probe Response is shown in FIG. 17.

Figure 17:
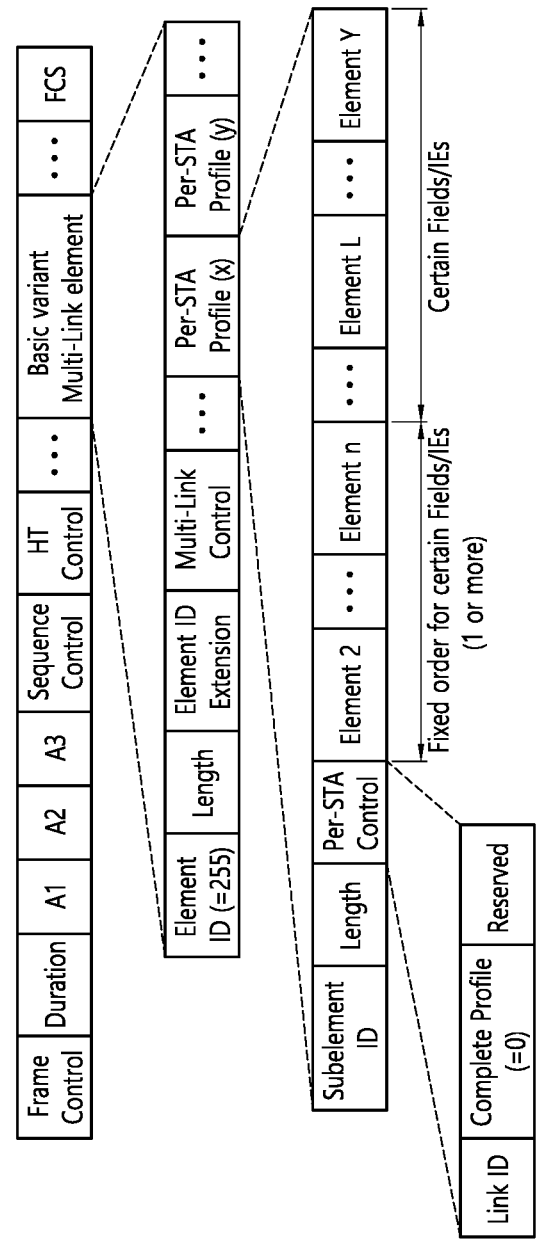
FIG. 17 shows the structure of the Partial Profile in the Per-STA Profile included in the Unsolicited broadcast ML Probe Response.

FIG. 17 shows the structure of the Partial Profile in the Per-STA Profile included in the Unsolicited broadcast ML Probe Response.

FIG. 17 is an example of a Partial Profile when the AP transmits an ML Probe Response including only partial information of the AP without a separate request from the STA.

For example, as shown in FIG. 17, when the Basic variant Multi-Link element includes a Partial Profile, the Complete Profile of the Per-STA Control field is set to 0 for the Per-STA Profile subelement, information corresponding to Element L to Element Y may be included in the order of Element ID.

That is, in this specification, a partial profile is defined to provide partial information rather than complete information, a multi-link element configuration for a specific profile related to this is proposed.

As another example, when a non-AP STA requests information about a critical update rather than complete information about an AP MLD, the AP receiving the request message for this requests Link corresponding to the requested AP of the Multi-Link element in the response message. In the Per-STA Profile including ID, elements related to critical update are included and transmitted.

At this time, the AP may transmit a response message including only the most recently changed information of the requested AP according to the STA's request message, or may transmit a response message including all information related to critical update of the requested AP.

This specification proposes a structure for a Critical Update Profile for the AP to provide all information related to Critical Update.

When the STA requests only Critical Update information, not all information about the APs of the AP MLD, upon receiving this, the AP may transmit all Critical Update information (ie, all element IEs classified as Critical update events in 802.11be) for the requested APs in the Multi-Link element according to the request type.

Therefore, the present specification proposes fields and/or elements to be included in a fixed order for all critical update information.

In this specification, this structure is defined as a Critical Update Profile. However, the name may be changed later.

One or more of the following information may be included for the corresponding Critical Update Profile.

1) Change Sequence element (or field): This field is information that must be included when the AP provides critical update information of the AP, and means change sequence number information of the current AP. Through the corresponding information, the STA can check Change Sequence number information of various BSS Parameters information currently received by the STA. If the information is included in the form of an element, no separate indicator is required, but if it is included in the form of a field, a separate indicator is required to indicate the presence of the field.

2) Elements (or fields) classified as a Critical Update event in the 802.11 standard (NOTE: Refer to the list of elements classified as a Critical update in 11.2.3.15 TIM Broadcast of the IEEE 802.11 standard):

A. Channel Switch Announcement
B. Extended Channel Switch Announcement element
C. EDCA parameters element
D. Quiet element
E. DSSS Parameter Set
F. CF Parameter Set element
G. HT Operation element
H. Wide Bandwidth Channel Switch element
I. Channel Switch Wrapper element
J. Operating Mode Notification element
K. Quiet Channel element
L. VHT Operation element
M. HE Operation element
N. Broadcast TWT element
O. BSS Color Change Announcement element
P. MU EDCA Parameter Set element
Q. Spatial Reuse Parameter Set element
R. UORA Parameter Set element
S. EHT Operation element
T. Basic variant Multi-Link element For reference, elements classified as the above-mentioned Critical update event may be added with other elements or fields according to future standard versions.

Based on the above information, a Critical Update Profile can be configured as in the following examples.

When the AP provides Critical Update-related information, the AP's current Change Sequence number information must be fixedly included. When the STA receives a message including the Critical Update Profile, it can confirm that the currently received information is the Critical Update information of the indicated AP by checking the Change Sequence number information. In addition, the corresponding Critical Update Profile may be included in the Per-STA Profile subelement of the Multi-Link element to deliver Critical Update related information corresponding to the AP indicated by the Link ID of the Per-STA Profile subelement. Through this, the AP can deliver information of several APs (ie, including information of other APs) to the non-AP STA through one message. For example, when channel switch announcement information (i.e., Critical Update information) of AP 2 of AP MLD is changed, an Unsolicited Broadcast Probe Response frame or Probe Response frame containing the changed information is sent to AP 2 for the Multi-Link element. The corresponding change may be notified to the STA by delivering Critical Update Profile information together with Change Sequence Number information of the current AP 2 in the corresponding Per-STA Profile.

At this time, the change sequence number information of the AP may be represented in the form of a change sequence field or element.

Examples of the Critical Update Profile in the Per-STA Profile of the Multi-Link element according to the Change Sequence Number information format are as follows.

Figure 18:
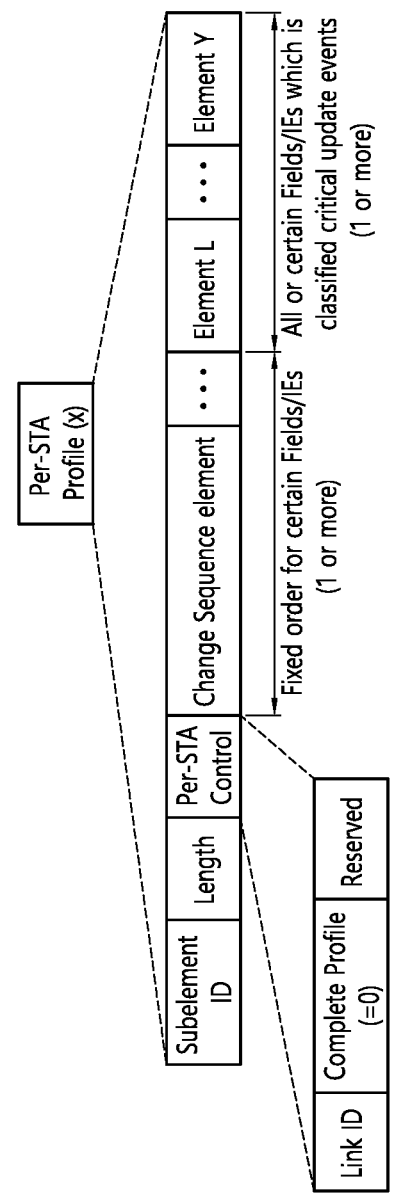
FIG. 18 shows an example of a Critical Update Profile structure of the Per-STA Profile in the Multi-Link element.

FIG. 18 shows an example of a Critical Update Profile structure of the Per-STA Profile in the Multi-Link element.

FIG. 18 is an example of a Critical Update Profile including a Change Sequence element for Change Sequence number information. If the Critical Update Profile information for the AP corresponding to the Per-STA Profile (x) is included in the Per-STA Profile (x) in the Multi-Link element, since the corresponding information means partial information, the value of the Complete Profile subfield of the Per-STA Control field is set to 0. At this time, since the Critical Update Profile always includes the current Change Sequence number information of the AP, Change Sequence element information indicating this is fixedly present in a fixed order after the Per-STA Control field. Thereafter, Elements L to Element Y may include Elements classified as Critical Updates provided by the corresponding AP. At this time, Element L to Element Y may exist variably according to information provided by the AP.

If the Change Sequence field of the Change Sequence element=N, if the AP only provides information corresponding to the gap between Change Sequence field=N−1 and Change Sequence field=N (That is, when only critical update change information corresponding to Change Sequence field=N is provided), only changed IE (Information Element) information is included.

If the Change Sequence field of the Change Sequence element=N, if the AP provides all IE information related to the current Critical Update (That is, elements (or fields) classified as Critical Update events in the 802.11 standard), all IE information about the Critical Update is included.

Figure 19:
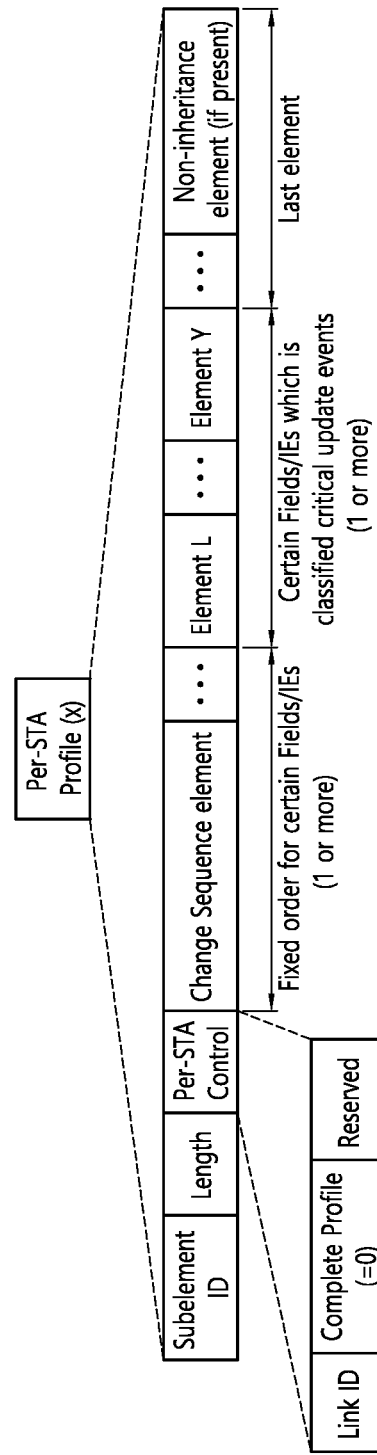
FIG. 19 shows another example of the Critical Update Profile structure of the Per-STA Profile in the Multi-Link element.

FIG. 19 shows another example of the Critical Update Profile structure of the Per-STA Profile in the Multi-Link element.

FIG. 19 is an example of a Critical Update Profile including a Change Sequence element for Change Sequence number information as shown in FIG. 18, but when an inheritance rule is applied to a corresponding frame, as shown in FIG. 19, a non-inheritance element may exist as the last element of Per-STA Profile (x). In the current 802.11be standard, the inheritance rule is applied only to a response message including complete information about a message requested by an STA for complete information. However, even when an AP later provides partial information, the same inheritance rule may be applied in the case of a Profile including information of many elements or fields, such as a Critical Update Profile. Therefore, the example of FIG. 19 considers the case where the inheritance rule is applied even when the AP includes the Multi-Link element in the Unsolicited (broadcast) Probe Response frame or Probe Response frame to provide Critical Update information of several APs, and considers the case where a non-inheritance element exists in the Per-STA profile (x) as above.

Figure 20:
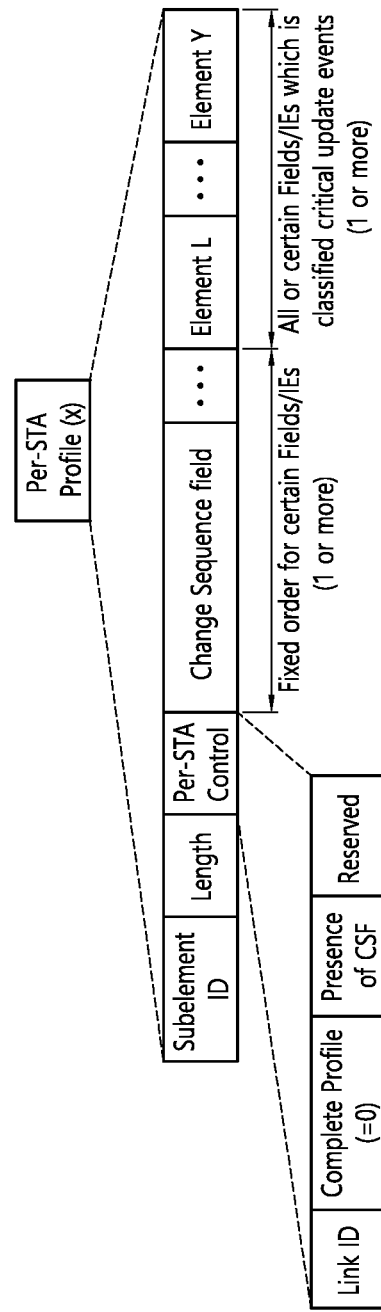
FIG. 20 shows another example of the Critical Update Profile structure of the Per-STA Profile in the Multi-Link element.

FIG. 20 shows another example of the Critical Update Profile structure of the Per-STA Profile in the Multi-Link element.

FIG. 20 is an example of a Critical Update Profile including a Change Sequence field for Change Sequence number information. If the Critical Update Profile information for the AP corresponding to the Per-STA Profile (x) is included in the Per-STA Profile (x) in the Multi-Link element, since the corresponding information means partial information, the value of the Complete Profile subfield of the Per-STA Control field is set to 0. At this time, since the Critical Update Profile always includes the current Change Sequence number information of the AP, Change Sequence field information indicating this is fixedly present in a fixed order after the Per-STA Control field. At this time, the Change Sequence field additionally requires a Presence field for notifying the presence or absence of the field. In this structure, a 'Presence of CSF (Change Sequence Field)' subfield is additionally proposed in the Per-STA Control field. If the corresponding Presence of CSF subfield value is 1, it indicates that the Change Sequence field exists in the Per-STA Profile (x). If not, the corresponding Presence of CSF subfield value is 0.

Thereafter, Element L to Element Y may include IEs classified as Critical Updates provided by the corresponding AP. At this time, Element L to Element Y may exist variably according to information provided by the AP.

If the Change Sequence field of the Change Sequence field=N, when the AP provides only information corresponding to the gap between Change Sequence field=N−1 and Change Sequence field=N (That is, when only critical update change information corresponding to Change Sequence field=N is provided), only changed IE information is included.

If the Change Sequence field of the Change Sequence field=N, if the AP provides all IE information related to the current Critical Update (That is, elements (or fields) classified as Critical Update events in the 802.11 standard), all IE information about the Critical Update is included.

Figure 21:
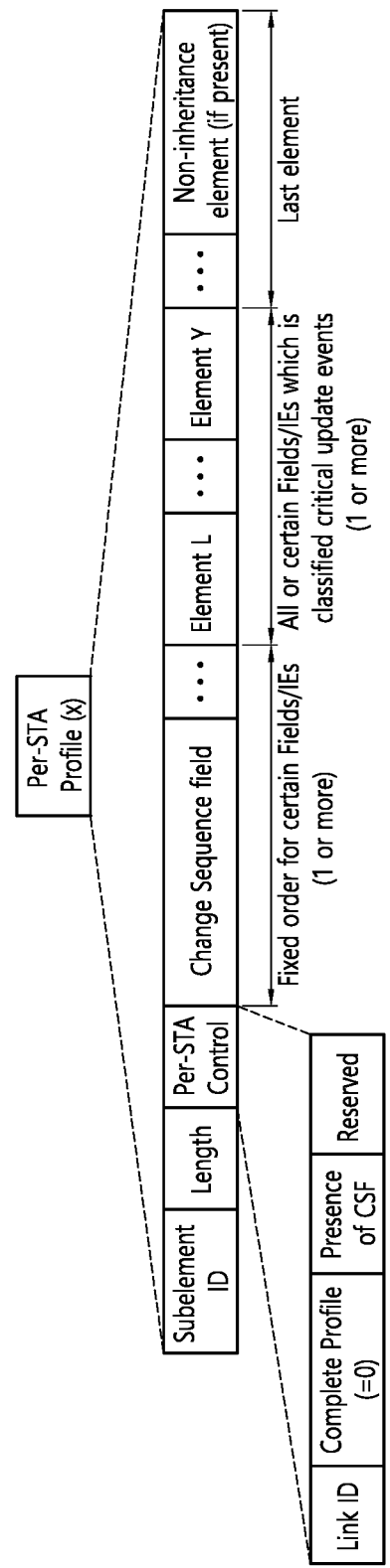
FIG. 21 shows another example of the Critical Update Profile structure of the Per-STA Profile in the Multi-Link element.

FIG. 21 shows another example of the Critical Update Profile structure of the Per-STA Profile in the Multi-Link element.

FIG. 21 is an example of a Critical Update Profile including a Change Sequence field for Change Sequence number information, as shown in FIG. 20. When the inheritance rule is applied to the frame, a non-inheritance element may exist as the last element of Per-STA Profile (x) as shown in FIG. 6. In the current 11be standard, the inheritance rule is applied only to response messages that include complete information about the message for which the STA requested complete information. Even when an AP provides partial information later, the same inheritance rule may be applied to a profile including information of many elements or fields, such as a Critical Update Profile. Therefore, this example considers the case where the inheritance rule is applied even when the AP includes the Unsolicited (broadcast) Probe Response frame or the Multi-Link element in the Probe Response frame to provide Critical Update information of multiple APs and considers the case where there is a non-inheritance element in STA profile (x).

That is, in this specification, a Critical Update Profile for defining IE information classified as Critical Update is defined, and a multi-link element configuration for a specific profile related to this is proposed.

Hereinafter, the above-described embodiment will be described with reference to FIGS. 1 to 21.

Figure 22:
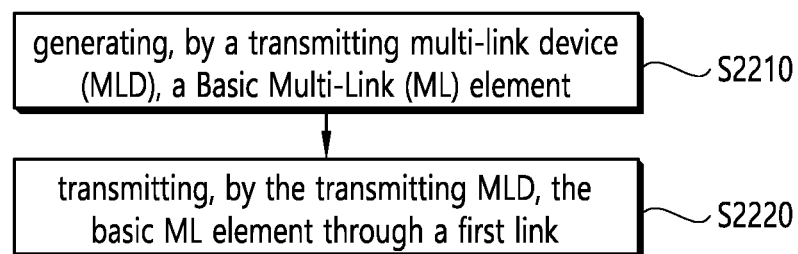
FIG. 22 is a flowchart illustrating a procedure in which a transmitting MLD configures the Multi-Link element (ML element) to deliver information on a change sequence number of another AP according to the present embodiment.

FIG. 22 is a flowchart illustrating a procedure in which a transmitting MLD configures the Multi-Link element (ML element) to deliver information on a change sequence number of another AP according to the present embodiment.

The example of FIG. 22 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for transmitting information related to critical updates of other APs in MLD communication by including a CSF field in a basic ML element. Here, a first transmitting STA connected through a first link to a first receiving STA included in a receiving MLD may correspond to a peer AP, and second and third transmitting STAs connected through different links (second and third links) may correspond to different APs.

In step S2210, a transmitting multi-link device (MLD) generates a Basic Multi-Link (ML) element.

In step S2210, the transmitting MLD transmits the basic ML element through a first link.

The transmitting MLD includes a first transmitting station (STA) operating on the first link and a second transmitting STA operating on a second link. The receiving MLD includes a first receiving STA operating on the first link and a second receiving STA operating on the second link.

The basic ML element includes a profile field of the second transmitting STA. The profile field of the second transmitting STA includes a first Change Sequence Field (CSF) present field. When a value of the first CSF present field is set to 1, the profile field of the second transmitting STA includes the first CSF field. The first CSF field includes information on a current change sequence number of the second transmitting STA. That is, the first receiving STA may obtain a change sequence number value of the second transmitting STA through the basic ML element when a critical update of the second transmitting STA occurs.

The basic ML element may be included in a beacon frame, a probe response frame, or an association response frame. The probe response frame may be a response frame in response to a probe request frame or an unsolicited probe response frame. In addition, a probe request frame used for Multi-Link Setup (ML setup) may include a probe request ML element. Unlike the basic ML elements, the probe request ML element does not include all elements, but includes only requesting/requested elements and is configured as a frame.

That is, this embodiment proposes a method of transmitting information on the change sequence number (or critical update event version) of other APs in the AP MLD by including the CSF field in the Per-STA profile (profile of the second or third transmitting STA) included in the basic ML element. When ML configuration is performed between an AP MLD and a non-AP MLD, the non-AP MLD obtains a change sequence number value of another AP through a beacon frame, a probe response frame, or an association response frame, so that the non-AP MLD can check the exact critical update event version of another AP at that time. As such, in the event of a critical update during the ML setup process, an error in which the version of critical update information of another AP and the version of critical update information of a non-AP STA do not match can be prevented.

When the value of the first CSF present field is set to 0, the profile field of the second transmitting STA may not include the first CSF field.

The current change sequence number of the second transmitting STA may be increased by 1 when a critical update event for the second transmitting STA occurs. The first receiving STA may confirm that the critical update event of the second transmitting STA has occurred based on the current change sequence number of the second transmitting STA. Information related to the critical update event may include Channel Switch Announcement, Extended Channel Switch Announcement element, EDCA parameters element, Quiet element, DSSS Parameter Set, CF Parameter Set element, HT Operation element, Wide Bandwidth Channel Switch element, Channel Switch Wrapper element, Operating Mode Notification element, Quiet Channel element, VHT Operation element, HE Operation element, Broadcast TWT element, BSS Color Change Announcement element, MU EDCA Parameter Set element, Spatial Reuse Parameter Set element, UORA Parameter Set element, EHT Operation element and/or Basic variant Multi-Link element.

The profile field of the second transmitting STA may further include a first STA control field. The first STA control field may include a first complete profile field and the first CSF present field. A value of the first complete profile field may be set to 0.

The transmitting MLD may further include a third transmitting STA operating in a third link, and the receiving MLD may further include a third receiving STA operating in the third link.

The basic ML element may further include a profile field of the third transmitting STA. The profile field of the third transmitting STA may include a second CSF present field. When the value of the second CSF present field is set to 1, the profile field of the second transmitting STA may include a second CSF field. The second CSF field may include information on a current change sequence number of the third transmitting STA. That is, the first receiving STA may obtain a change sequence number value of the third transmitting STA through the basic ML element when a critical update of the third transmitting STA occurs.

When the value of the second CSF present field is set to 0, the profile field of the third transmitting STA may not include the second CSF field.

The current change sequence number (or current critical update event version) of the third transmitting STA may increased by 1 when a critical update event for the third transmitting STA occurs. The first receiving STA may confirm that the critical update event of the third transmitting STA has occurred based on the current change sequence number of the third transmitting STA.

The profile field of the third transmitting STA may further include a second STA control field. The second STA control field may include a second complete profile field and the second CSF present field. A value of the second complete profile field may be set to 0.

Information on the current change sequence number of the second and third transmitting STAs may be a change sequence number or count value of a basic service set (BSS) parameter. The (first and second) CSF fields may be named a BSS Parameter Change Count (BPCC) subfield.

Figure 23:
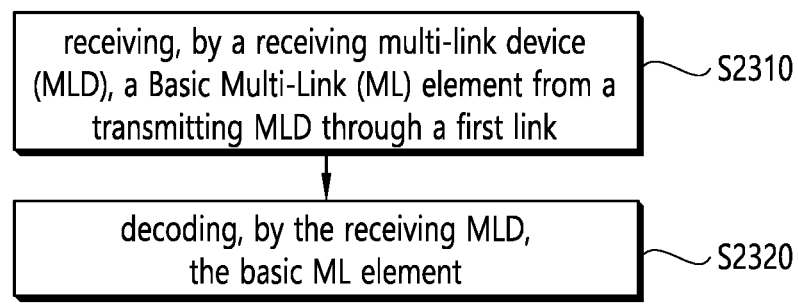
FIG. 23 is a flowchart illustrating a procedure in which a receiving MLD receives the Multi-Link element (ML element) to deliver information on a change sequence number of another AP according to the present embodiment.

FIG. 23 is a flowchart illustrating a procedure in which a receiving MLD receives the Multi-Link element (ML element) to deliver information on a change sequence number of another AP according to the present embodiment.

The example of FIG. 23 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for transmitting information related to critical updates of other APs in MLD communication by including a CSF field in a basic ML element. Here, a first transmitting STA connected through a first link to a first receiving STA included in a receiving MLD may correspond to a peer AP, and second and third transmitting STAs connected through different links (second and third links) may correspond to different APs.

In step S2310, a receiving multi-link device (MLD) receives a Basic Multi-Link (ML) element from a transmitting MLD through a first link.

In step S2310, the receiving MLD decodes the basic ML element.

The transmitting MLD includes a first transmitting station (STA) operating on the first link and a second transmitting STA operating on a second link. The receiving MLD includes a first receiving STA operating on the first link and a second receiving STA operating on the second link.

The basic ML element includes a profile field of the second transmitting STA. The profile field of the second transmitting STA includes a first Change Sequence Field (CSF) present field. When a value of the first CSF present field is set to 1, the profile field of the second transmitting STA includes the first CSF field. The first CSF field includes information on a current change sequence number of the second transmitting STA. That is, the first receiving STA may obtain a change sequence number value of the second transmitting STA through the basic ML element when a critical update of the second transmitting STA occurs.

The basic ML element may be included in a beacon frame, a probe response frame, or an association response frame. The probe response frame may be a response frame in response to a probe request frame or an unsolicited probe response frame. In addition, a probe request frame used for Multi-Link Setup (ML setup) may include a probe request ML element. Unlike the basic ML elements, the probe request ML element does not include all elements, but includes only requesting/requested elements and is configured as a frame.

That is, this embodiment proposes a method of transmitting information on the change sequence number (or critical update event version) of other APs in the AP MLD by including the CSF field in the Per-STA profile (profile of the second or third transmitting STA) included in the basic ML element. When ML configuration is performed between an AP MLD and a non-AP MLD, the non-AP MLD obtains a change sequence number value of another AP through a beacon frame, a probe response frame, or an association response frame, so that the non-AP MLD can check the exact critical update event version of another AP at that time. As such, in the event of a critical update during the ML setup process, an error in which the version of critical update information of another AP and the version of critical update information of a non-AP STA do not match can be prevented.

When the value of the first CSF present field is set to 0, the profile field of the second transmitting STA may not include the first CSF field.

The current change sequence number of the second transmitting STA may be increased by 1 when a critical update event for the second transmitting STA occurs. The first receiving STA may confirm that the critical update event of the second transmitting STA has occurred based on the current change sequence number of the second transmitting STA. Information related to the critical update event may include Channel Switch Announcement, Extended Channel Switch Announcement element, EDCA parameters element, Quiet element, DSSS Parameter Set, CF Parameter Set element, HT Operation element, Wide Bandwidth Channel Switch element, Channel Switch Wrapper element, Operating Mode Notification element, Quiet Channel element, VHT Operation element, HE Operation element, Broadcast TWT element, BSS Color Change Announcement element, MU EDCA Parameter Set element, Spatial Reuse Parameter Set element, UORA Parameter Set element, EHT Operation element and/or Basic variant Multi-Link element.

The profile field of the second transmitting STA may further include a first STA control field. The first STA control field may include a first complete profile field and the first CSF present field. A value of the first complete profile field may be set to 0.

The transmitting MLD may further include a third transmitting STA operating in a third link, and the receiving MLD may further include a third receiving STA operating in the third link.

The basic ML element may further include a profile field of the third transmitting STA. The profile field of the third transmitting STA may include a second CSF present field. When the value of the second CSF present field is set to 1, the profile field of the second transmitting STA may include a second CSF field. The second CSF field may include information on a current change sequence number of the third transmitting STA. That is, the first receiving STA may obtain a change sequence number value of the third transmitting STA through the basic ML element when a critical update of the third transmitting STA occurs.

When the value of the second CSF present field is set to 0, the profile field of the third transmitting STA may not include the second CSF field.

The current change sequence number (or current critical update event version) of the third transmitting STA may increased by 1 when a critical update event for the third transmitting STA occurs. The first receiving STA may confirm that the critical update event of the third transmitting STA has occurred based on the current change sequence number of the third transmitting STA.

The profile field of the third transmitting STA may further include a second STA control field. The second STA control field may include a second complete profile field and the second CSF present field. A value of the second complete profile field may be set to 0.

Information on the current change sequence number of the second and third transmitting STAs may be a change sequence number or count value of a basic service set (BSS) parameter. The (first and second) CSF fields may be named a BSS Parameter Change Count (BPCC) subfield.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a Basic Multi-Link (ML) element from a transmitting multi-link device (MLD) through a first link; and decodes the basic ML element.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a Basic Multi-Link (ML) element from a transmitting multi-link device (MLD) through a first link; and decoding the basic ML element. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    receiving, by a first non-access point (non-AP) station (STA), a Basic Multi-Link (ML) element from a first AP; and
    decoding, by the first non-AP STA, the basic ML element,
    wherein the first AP operating on a first link and a second AP operating on a second link are affiliated with an AP multi-link device (MLD),
    wherein the first non-AP STA operating on the first link and a second non-AP STA operating on the second link affiliated with a non-AP MLD,
    wherein the basic ML element includes a Per-STA Profile subelement for the second AP,
    wherein the Per-STA Profile subelement for the second AP includes a first basic service set (BSS) Parameters Change Count present subfield,
    wherein based on the first BSS Parameters Change Count present subfield set to 1, the Per-STA Profile subelement for the second AP includes the first BSS Parameters Change Count subfield, and
    wherein the first BSS Parameters Change Count subfield includes the most recent BSS parameters change count of the second AP.

2. The method of claim 1, wherein based on the first BSS Parameters Change Count present subfield set to 0, the Per-STA Profile subelement for the second AP does not include the first BSS Parameters Change Count subfield.

3. The method of claim 1, wherein the current change sequence number of the second AP is increased by 1 when a critical update event for the second AP occurs,
    wherein the Per-STA Profile subelement for the second AP further includes a first STA control field,
    wherein the first STA control field includes a first complete profile subfield and the first BSS Parameters Change Count present subfield,
    wherein a value of the first complete profile subfield is set to 0.

4. The method of claim 1, wherein a third AP operating on a third link is further affiliated with the AP MLD, wherein a third non-AP STA operating on the third link is further affiliated with the non-AP MLD, wherein the basic ML element further includes a Per-STA Profile subelement for the third AP.

5. The method of claim 4, wherein the Per-STA Profile subelement for the third AP includes a second BSS Parameters Change Count present subfield, wherein based on the second BSS Parameters Change Count present subfield set to 1, the Per-STA Profile subelement for the third AP includes a second BSS Parameters Change Count subfield, wherein the second BSS Parameters Change Count subfield includes information on a current change sequence number of the third AP, wherein based on the second BSS Parameters Change Count present subfield set to 0, the Per-STA Profile subelement for the third AP does not include the second BSS Parameters Change Count subfield.

6. The method of claim 5, wherein the current change sequence number of the third AP is increased by 1 when a critical update event for the third AP occurs, wherein the Per-STA Profile subelement for the third AP further includes a second STA control field, wherein the second STA control field includes a second complete profile subfield and the second BSS Parameters Change Count present subfield, wherein a value of the second complete profile subfield is set to 0.

7. The method of claim 6, wherein information on the current change sequence number of the second and third APs is a change sequence number or count value of a basic service set (BSS) parameter.

8. The method of claim 1, wherein the basic ML element is included in a beacon frame, a probe response frame, or an association response frame.

9. A first non-access point (non-AP) station (STA) in a wireless local area network (WLAN) system, the first non-AP STA comprising:
    a memory;
    a transceiver; and
    a processor operatively coupled to the memory and the transceiver,
    wherein processor is configured to:
    receive a Basic Multi-Link (ML) element from a first AP; and
    decode the basic ML element,
    wherein the first AP operating on a first link and a second AP operating on a second link are affiliated with an AP multi-link device (MLD),
    wherein the first non-AP STA operating on the first link and a second non-AP STA operating on the second link affiliated with a non-AP MLD,
    wherein the basic ML element includes a Per-STA Profile subelement for the second AP,
    wherein the Per-STA Profile subelement for the second AP includes a first basic service set (BSS) Parameters Change Count present subfield,
    wherein based on the first BSS Parameters Change Count present subfield set to 1, the Per-STA Profile subelement for the second AP includes the first BSS Parameters Change Count subfield, and
    wherein the first BSS Parameters Change Count subfield includes the most recent BSS parameters change count of the second AP.

10. A method in a wireless local area network (WLAN) system, the method comprising:

generating, by a first access point (AP), a Basic Multi-Link (ML) element; and transmitting, by the first AP, the basic ML element to a first non-AP station (STA), wherein the first AP operating on a first link and a second AP operating on a second link are affiliated with an AP multi-link device (MLD), wherein the first non-AP STA operating on the first link and a second non-AP STA operating on the second link affiliated with a non-AP MLD, wherein the basic ML element includes a Per-STA Profile subelement for the second AP, wherein the Per-STA Profile subelement for the second AP includes a first basic service set (BSS) Parameters Change Count present subfield, wherein based on the first BSS Parameters Change Count present subfield set to 1, the Per-STA Profile subelement for the second AP includes the first BSS Parameters Change Count subfield, and wherein the first BSS Parameters Change Count subfield includes the most recent BSS parameters change count of the second AP.

11. The method of claim 10, wherein based on the first BSS Parameters Change Count present subfield set to 0, the Per-STA Profile subelement for the second AP does not include the first BSS Parameters Change Count subfield.

12. The method of claim 10, wherein the current change sequence number of the second AP is increased by 1 when a critical update event for the second AP occurs, wherein the Per-STA Profile subelement for the second AP further includes a first STA control field, wherein the first STA control field includes a first complete profile subfield and the first BSS Parameters Change Count present subfield, wherein a value of the first complete profile subfield is set to 0.

13. The method of claim 10, wherein a third AP operating on a third link is further affiliated with the AP MLD, wherein a third non-AP STA operating on the third link is further affiliated with the non-AP MLD, wherein the basic ML element further includes a Per-STA Profile subelement for the third AP.

14. The method of claim 13, wherein the Per-STA Profile subelement for the third AP includes a second BSS Parameters Change Count present subfield, wherein based on the second BSS Parameters Change Count present subfield set to 1, the Per-STA Profile subelement for the third AP includes a second BSS Parameters Change Count subfield, wherein the second BSS Parameters Change Count subfield includes information on a current change sequence number of the third AP, wherein based on the second BSS Parameters Change Count present subfield set to 0, the Per-STA Profile subelement for the third AP does not include the second BSS Parameters Change Count subfield.

15. The method of claim 14, wherein the current change sequence number of the third AP is increased by 1 when a critical update event for the third AP occurs, wherein the Per-STA Profile subelement for the third AP further includes a second STA control field, wherein the second STA control field includes a second complete profile subfield and the second BSS Parameters Change Count present subfield, wherein a value of the second complete profile subfield is set to 0.

16. The method of claim 15, wherein information on the current change sequence number of the second and third APs is a change sequence number or count value of a basic service set (BSS) parameter.

17. The method of claim 10, wherein the basic ML element is included in a beacon frame, a probe response frame, or an association response frame.

* * * * *